(12) United States Patent
Lee

(10) Patent No.: US 6,895,050 B2
(45) Date of Patent: May 17, 2005

(54) APPARATUS AND METHOD FOR ALLOCATING BITS TEMPORALY BETWEEN FRAMES IN A CODING SYSTEM

(76) Inventor: Jungwoo Lee, 104 York Dr., Princeton, NJ (US) 07540

( * ) Notice: Subject to any disclaimer, the term of this patent is extended or adjusted under 35 U.S.C. 154(b) by 727 days.

(21) Appl. No.: 09/838,459

(22) Filed: Apr. 19, 2001

(65) Prior Publication Data

US 2002/0168007 A1 Nov. 14, 2002

(51) Int. Cl.$^7$ ............................................. H04N 7/12
(52) U.S. Cl. ............................ 375/240.03; 375/240.04; 375/240.05; 375/240.06; 375/240.07
(58) Field of Search ...................... 375/240.02–240.07

(56) References Cited

U.S. PATENT DOCUMENTS 6,490,320 B1 * 12/2002 Vetro et al. ............. 375/240.08
6,526,097 B1 * 2/2003 Sethuraman et al. ...... 375/240.2
6,654,417 B1 * 11/2003 Hui ........................ 375/240.03

* cited by examiner

*Primary Examiner*—Andy Rao
(74) *Attorney, Agent, or Firm*—Andrew D. Fortney (57) ABSTRACT

A method and apparatus for temporally allocating bits between frames in a coding system such that temporal fluctuations are smoothed out. Namely, a picture quality is monitored on a frame by frame basis. An average distortion measure is derived from previous picture frames and that average is compared to the distortion measure of a current frame, where the result is used to effect bit budget allocation for each frame in an input image sequence.

21 Claims, 4 Drawing Sheets

APPARATUS AND METHOD FOR ALLOCATING BITS TEMPORALY BETWEEN FRAMES IN A CODING SYSTEM

GOVERNMENT RIGHTS IN THIS INVENTION

This invention was made with U.S. government support under contract number NIST contract 70NANB5H1178. The U.S. government has certain rights in this invention.

The present invention relates to an apparatus and concomitant method for optimizing the coding of an image sequence, e.g., motion video. More particularly, this invention relates to a method and apparatus that temporally allocates bits (i.e., bit budget) between frames of an image sequence to be encoded by a coding system.

BACKGROUND OF THE INVENTION

The increasing development of digital video technology presents an ever increasing problem of reducing the high cost of video compression codecs (coder/decoder) and resolving the inter-operability of equipment of different manufacturers. To achieve these goals, the Moving Picture Experts Group (MPEG) created international standards 11172 and 13818, which are incorporated herein in their entirety by reference.

In the area of rate control, MPEG does not define a specific algorithm for controlling the bit rate of an encoder. It is the task of the encoder designer to devise a rate control process for controlling the bit rate such that the decoder input buffer neither overflows nor underflows. Thus, it is the task of the encoder to monitor the number of bits generated by the encoder, thereby preventing the overflow and underflow conditions.

Currently, one way of controlling the bit rate is to alter the quantization process, which will affect the distortion of the input video image. By altering the quantizer scale, the bit rate can be changed and controlled. Although changing the quantizer scale is an effective method of implementing the rate control of an encoder, it has been shown that a poor rate control process will actually degrade the visual quality of the video image.

In the current MPEG coding strategies, the quantizer scale for each macroblock is selected by assuming that all the pictures of the same type have identical complexity within a group of pictures. However, the quantizer scale selected by this criterion may not achieve optimal coding performance, since the complexity of each picture will vary with time.

Furthermore, encoders that utilize global-type transforms have similar problems. For example, one such global-type compression technique appears in the Proceedings of the International Conference on Acoustics, Speech and Signal Processing, San Francisco, Calif. March 1992, volume IV, pages 657–660, where there is disclosed a signal compression system which applies a hierarchical subband decomposition, or wavelet transform, followed by the hierarchical successive approximation entropy-coded quantizer incorporating zerotrees. The representation of signal data using a multiresolution hierarchical subband representation was disclosed by Burt et al. in IEEE Trans. on Commun., Vol Com-31, No. 4, April 1983, page 533. A wavelet pyramid, also known as critically sampled quadrature-mirror filter (QMF) subband representation, is a specific type of multiresolution hierarchical subband representation of an image. A wavelet pyramid was disclosed by Pentland et al. in Proc. Data Compression Conference Apr. 8–11, 1991, Snowbird, Utah. A QMF subband pyramid has been described in "Subband Image Coding", J. W. Woods ed., Kluwer Academic Publishers, 1991 and 1. Daubechies, Ten Lectures on Wavelets, Society for Industrial and Applied Mathematics (SIAM): Philadelphia, Pa., 1992. Furthermore, U.S. Pat. No. 5,412,741 issued May 2, 1995 and herein incorporated by reference discloses an apparatus and method for encoding information with a high degree of compression.

The output bit stream from a video encoder tends to have a variable bit rate that fluctuates according to scene contents and the nature of the coding process used by the encoder. As such, the encoder requires a mechanism to regulate the output bit rate to match the channel rate with minimum loss of signal quality.

Therefore, a need exists in the art for an apparatus and method to maintain the overall quality of the video image while optimizing the coding rate. Similarly, encoders that utilize global-type transforms such as wavelet transforms have special requirements that are not met by the prior art rate control techniques.

SUMMARY OF THE INVENTION

The present invention is a method and apparatus for temporally allocating bits between frames of an image sequence in a coding system such that temporal fluctuations are smoothed out. Namely, a picture quality is monitored on a frame by frame basis. In one embodiment, an average distortion measure is derived from several previous picture frames and this temporal average distortion measure is compared to the distortion measure of a current frame. The difference of this comparison is measured against a predefined threshold, where the result is used to control the bit allocation for the current frame. In an alternative embodiment, the present method is applied in conjunction with a wavelet transform.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE PREFERRED EMBODIMENT

Figure 1:
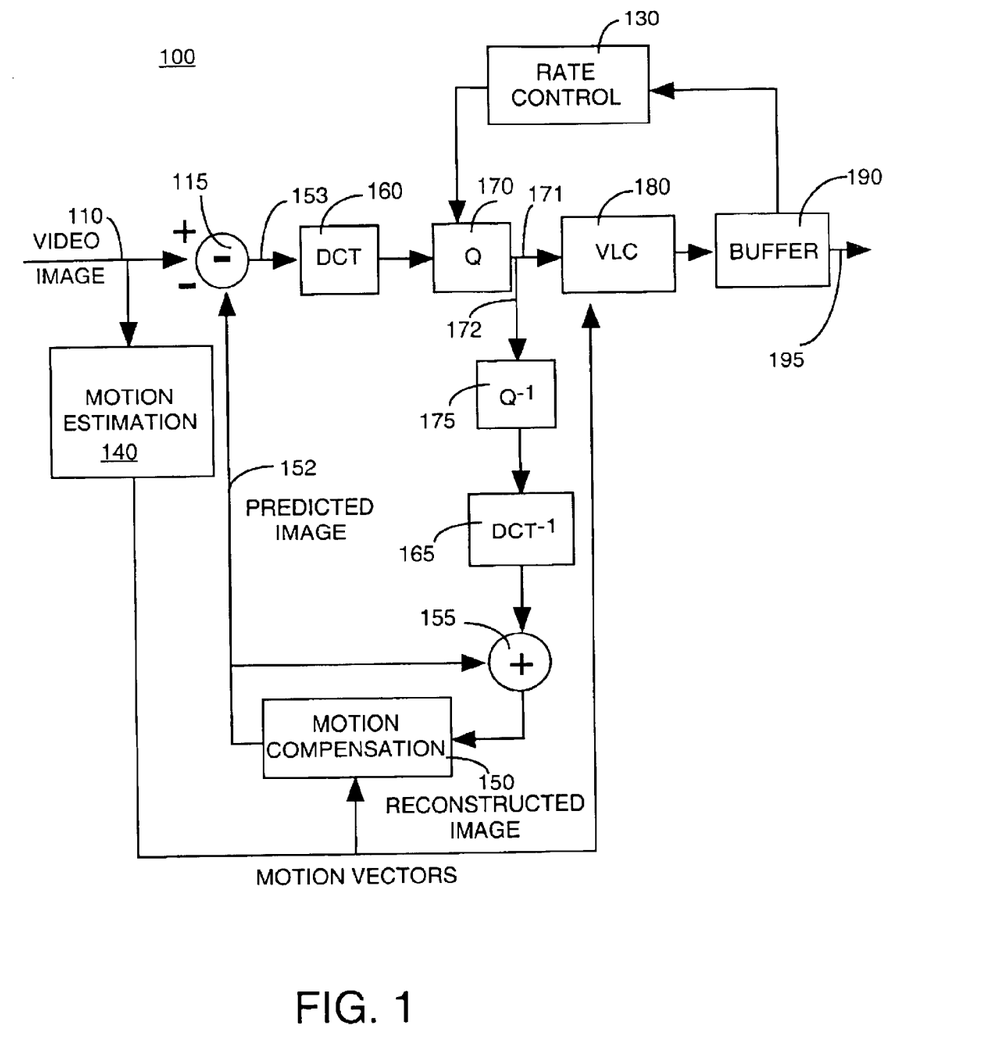
FIG. 1 illustrates a block diagram of the apparatus of the present invention.

FIG. 1 depicts a block diagram of the apparatus 100 of the present invention for using a picture quality or distortion measure to temporally allocate bits in an encoding system. In the preferred embodiment of the present invention, the apparatus 100 is an encoder or a portion of a more complex block-based motion compensation coding system. The apparatus 100 comprises a motion estimation module 140, a motion compensation module 150, a rate control module 130, a DCT module 160, a quantization (Q) module 170, a variable length coding (VLC) module 180, a buffer 190, an inverse quantization ($Q^{-1}$) module 175, an inverse DCT ($DCT^{-1}$) transform module 165, a subtractor 115 and a summer 155. Although the apparatus 100 comprises a plurality of modules, those skilled in the art will realize that the functions performed by the various modules are not required to be isolated into separate modules as shown in FIG. 1. For example, the set of modules comprising the motion compensation module 150, inverse quantization module 175 and inverse DCT module 165 is generally known as an "embedded decoder".

FIG. 1 illustrates an input video image (image sequence) 110 which is digitized and represented as a luminance and two color difference signals (Y, $C_r$, $C_b$) in accordance with the MPEG standards. These signals are further divided into a plurality of layers (sequence, group of pictures, picture, slice, macroblock and block) such that each picture (frame) is represented by a plurality of macroblocks. Each macroblock comprises four (4) luminance blocks, one $C_r$ block and one $C_b$ block where a block is defined as an eight (8) by eight (8) sample array. The division of a picture into block units improves the ability to discern changes between two successive pictures and improves image compression through the elimination of low amplitude transformed coefficients (discussed below). The digitized signal may optionally undergo preprocessing such as format conversion for selecting an appropriate window, resolution and input format.

The input video image on path 110 is received into motion estimation module 140 for estimating motion vectors. A motion vector is a two-dimensional vector which is used by motion compensation to provide an offset from the coordinate position of a block in the current picture to the coordinates in a reference frame. Because of the high redundancy that exists between the consecutive frames of a video image sequence, a current frame can be reconstructed from a reference frame and the difference between the current and reference frames by using the motion information (motion vectors). The reference frames can be a previous frame (P-frame), or previous and/or future frames (B-frames). The use of motion vectors greatly enhances image compression by reducing the amount of information that is transmitted on a channel because only the changes between the current and reference frames are coded and transmitted. Various methods are currently available to an encoder designer for implementing motion estimation.

The motion vectors from the motion estimation module 140 are received by the motion compensation module 150 for improving the efficiency of the prediction of sample values. Motion compensation involves a prediction that uses motion vectors to provide offsets into the past and/or future reference frames containing previously decoded sample values that are used to form the prediction error. Namely, the motion compensation module 150 uses the previously decoded frame and the motion vectors to construct an estimate of the current frame. Furthermore, those skilled in the art will realize that the functions performed by the motion estimation module and the motion compensation module can be implemented in a combined module, e.g., a single block motion compensator.

Furthermore, prior to performing motion compensation prediction for a given macroblock, a coding mode must be selected. In the area of coding mode decision, MPEG provides a plurality of different macroblock coding modes. Generally, these coding modes are grouped into two broad classifications, inter mode coding and intra mode coding. Intra mode coding involves the coding of a macroblock or picture that uses information only from that macroblock or picture. Conversely, inter mode coding involves the coding of a macroblock or picture that uses information both from itself and from macroblocks and pictures occurring at different times. Specifically, MPEG-2 provides macroblock coding modes which include intra mode, no motion compensation mode (No MC), frame/field/dual-prime motion compensation inter mode, forward/backward/average inter mode and field/frame DCT mode. The proper selection of a coding mode for each macroblock will improve coding performance. Again, various methods are currently available to an encoder designer for implementing coding mode decision.

Once a coding mode is selected, motion compensation module 150 generates a motion compensated prediction (predicted image) on path 152 of the contents of the block based on past and/or future reference pictures. This motion compensated prediction on path 152 is subtracted via subtractor 115 from the video image on path 110 in the current macroblock to form an error signal or predictive residual signal on path 153. The formation of the predictive residual signal effectively removes redundant information in the input video image. Namely, instead of transmitting the actual video image via a transmission channel, only the information necessary to generate the predictions of the video image and the errors of these predictions are transmitted, thereby significantly reducing the amount of data needed to be transmitted. To further reduce the bit rate, predictive residual signal on path 153 is passed to the DCT module 160 for encoding.

The DCT module 160 then applies a forward discrete cosine transform process to each block of the predictive residual signal to produce a set of eight (8) by eight (8) block of DCT coefficients. The discrete cosine transform is an invertible, discrete orthogonal transformation where the DCT coefficients represent the amplitudes of a set of cosine basis functions. One advantage of the discrete cosine transform is that the DCT coefficients are uncorrelated. This decorrelation of the DCT coefficients is important for compression, because each coefficient can be treated independently without the loss of compression efficiency. Furthermore, the DCT basis function or subband decomposition permits effective use of psychovisual criteria which is important for the next step of quantization.

The resulting 8×8 block of DCT coefficients is received by quantization module 170 where the DCT coefficients are quantized. The process of quantization reduces the accuracy with which the DCT coefficients are represented by dividing the DCT coefficients by a set of quantization values with appropriate rounding to form integer values. The quantization values can be set individually for each DCT coefficient, using criteria based on the visibility of the basis functions (known as visually weighted quantization). Namely, the quantization value corresponds to the threshold for visibility of a given basis function, i.e., the coefficient amplitude that is just detectable by the human eye. By quantizing the DCT coefficients with this value, many of the DCT coefficients are converted to the value "zero", thereby improving image compression efficiency. The process of quantization is a key operation and is an important tool to achieve visual quality and to control the encoder to match its output to a given bit rate (rate control). Since a different quantization value can be applied to each DCT coefficient, a "quantization matrix" is generally established as a reference table, e.g., a luminance quantization table or a chrominance quantization table. Thus, the encoder chooses a quantization matrix that determines how each frequency coefficient in the transformed block is quantized.

However, subjective perception of quantization error greatly varies with the frequency and it is advantageous to use coarser quantization values for the higher frequencies. Namely, human perceptual sensitivity of quantization errors are lower for the higher spatial frequencies. As a result, high frequencies are quantized more coarsely with fewer allowed values than low frequencies. Furthermore, an exact quantization matrix depends on many external parameters such as the characteristics of the intended display, the viewing distance and the amount of noise in the source. Thus, it is possible to tailor a particular quantization matrix for an application or even for an individual sequence of frames. Generally, a customized quantization matrix can be stored as context together with the compressed video image. The proper selection of a quantizer scale is performed by the rate control module 130.

Next, the resulting 8×8 block of quantized DCT coefficients is received by variable length coding module 180 via signal connection 171, where the two-dimensional block of quantized coefficients is scanned in a "zig-zag" order to convert it into a one-dimensional string of quantized DCT coefficients. This zig-zag scanning order is an approximate sequential ordering of the DCT coefficients from the lowest spatial frequency to the highest. Since quantization generally reduces DCT coefficients of high spatial frequencies to zero, the one-dimensional string of quantized DCT coefficients is typically represented by several integers followed by a string of zeros.

Variable length coding (VLC) module 180 then encodes the string of quantized DCT coefficients and all side-information for the macroblock such as macroblock type and motion vectors. The VLC module 180 utilizes variable length coding and run-length coding to efficiently improve coding efficiency. Variable length coding is a reversible coding process where shorter code-words are assigned to frequent events and longer code-words are assigned to less frequent events, while run-length coding increases coding efficiency by encoding a run of symbols with a single symbol. These coding schemes are well known in the art and are often referred to as Huffman coding when integer-length code words are used. Thus, the VLC module 180 performs the final step of converting the input video image into a valid data stream. Those skilled in the art will realize that the VLC module can be replaced with other types of entropy coders.

The data stream is received into a "First In-First Out" (FIFO) buffer 190. A consequence of using different picture types and variable length coding is that the overall bit rate into the FIFO is variable. Namely, the number of bits used to code each frame can be different. In applications that involve a fixed-rate channel, a FIFO buffer is used to match the encoder output to the channel for smoothing the bit rate. Thus, the output signal of FIFO buffer 190 is a compressed representation of the input video image on path 110, where it is sent to a storage medium or telecommunication channel via path 295.

The rate control module 130 serves to monitor and adjust the bit rate of the data stream entering the FIFO buffer 190 to prevent overflow and underflow on the decoder side (within a receiver or target storage device, not shown) after transmission of the data stream. Thus, it is the task of the rate control module 130 to monitor the status of buffer 190 to control the number of bits generated by the encoder.

In the preferred embodiment of the present invention, rate control module 130 monitors picture quality frame by frame using a picture quality measure. Namely, by carefully monitoring the picture quality of a plurality of immediately previous frames, a temporal bit allocation method can adaptively allocate a bit budget to a current frame; i.e., assigning and/or modifying a target bit rate for a current frame. For example, bits are temporally allocated for each picture type in accordance to the MPEG standard. In one embodiment, quality measures are derived for a number of immediate previous frames (e.g., three or more) for each frame type (e.g., I, P, or B frames). An average is derived from these quality measures and a current measure for a current frame is subtracted from the derived average and the difference is compared to a threshold value. The result from the comparison is used to control the allocation of bits for a current frame. In turn, a quantizer scale is selected for each macroblock such that target bit rate for a current picture is achieved while an optimal quantization scale ratio is maintained for successive macroblocks to produce a uniform visual quality over the entire picture.

Specifically, the rate control module 130 initially obtains a rough estimate of the complexity of a specific type of picture (I, P, B) from previously encoded pictures or by calculating the frame level target rate $T_I$, $T_P$ and $T_B$ for each frame type I frame, B frame and P frame e.g., using the TM4 and TM5 models of the MPEG standard. This estimated complexity is used to derive a predicted number of bits necessary to code each macroblock. With this knowledge, a quantizer scale is calculated for the macroblock in accordance with a complexity model having a polynomial form. This complexity model is derived to meet the constraint that the selected quantizer scales for the macroblocks should approach the target bit rate for the picture.

Furthermore, the quantizer scale is optionally refined by a modifier which is derived to meet a constraint that requires a constant visual quality to be maintained for the entire picture. Namely, the constraint requires an optimal quantization scale ratio to be maintained for successive macroblocks. The rate control module applies the modifier to the quantizer scale to produce an optimal quantizer scale which is used to code the macroblock. Once the macroblock is encoded, the rate control module recursively adjusts the complexity model through the use of a polynomial regression process. That is, the actual number of bits necessary to code the macroblock is used to refine the complexity model so as to improve the prediction of a quantizer scale for the next macroblock. A detailed description of such quantizer scale selection method is disclosed in U.S. Pat. No. 6,160,846 issued Dec. 12, 2000, which is incorporated herein by reference.

Returning to FIG. 1, the resulting 8×8 block of quantized DCT coefficients from the quantization module 170 is also received by the inverse quantization module 175 via signal connection 172. At this stage, the encoder regenerates I-frames and P-frames of the input video image by decoding the data so that they are used as reference frames for subsequent encoding. The inverse quantization module 175 starts the decoding process by dequantizing the quantized DCT coefficients. Namely, the quantized DCT coefficients are multiplied by a set of quantization values with appropriate rounding to produce integer values.

The resulting dequantized 8×8 block of DCT coefficients are passed to the inverse DCT module 165 where inverse DCT is applied to each macroblock to produce the decoded error signal. This error signal is added back to the prediction signal from the motion compensation module via summer 155 to produce a decoded reference picture (reconstructed image). Generally, if an I-frame or a P-frame is decoded, it will be stored, replacing the oldest stored reference. Thus, an apparatus 100 for temporally allocating bits between I, P and B frames such that a picture quality measure can be used to smooth out temporal fluctuations is disclosed.

It should be noted that although the present invention is disclosed in view of the MPEG standards, the present invention is not so limited. Specifically, the present invention can be employed in other encoders that are compliant to other standards e.g., ATSC, and the like.

Figure 2:
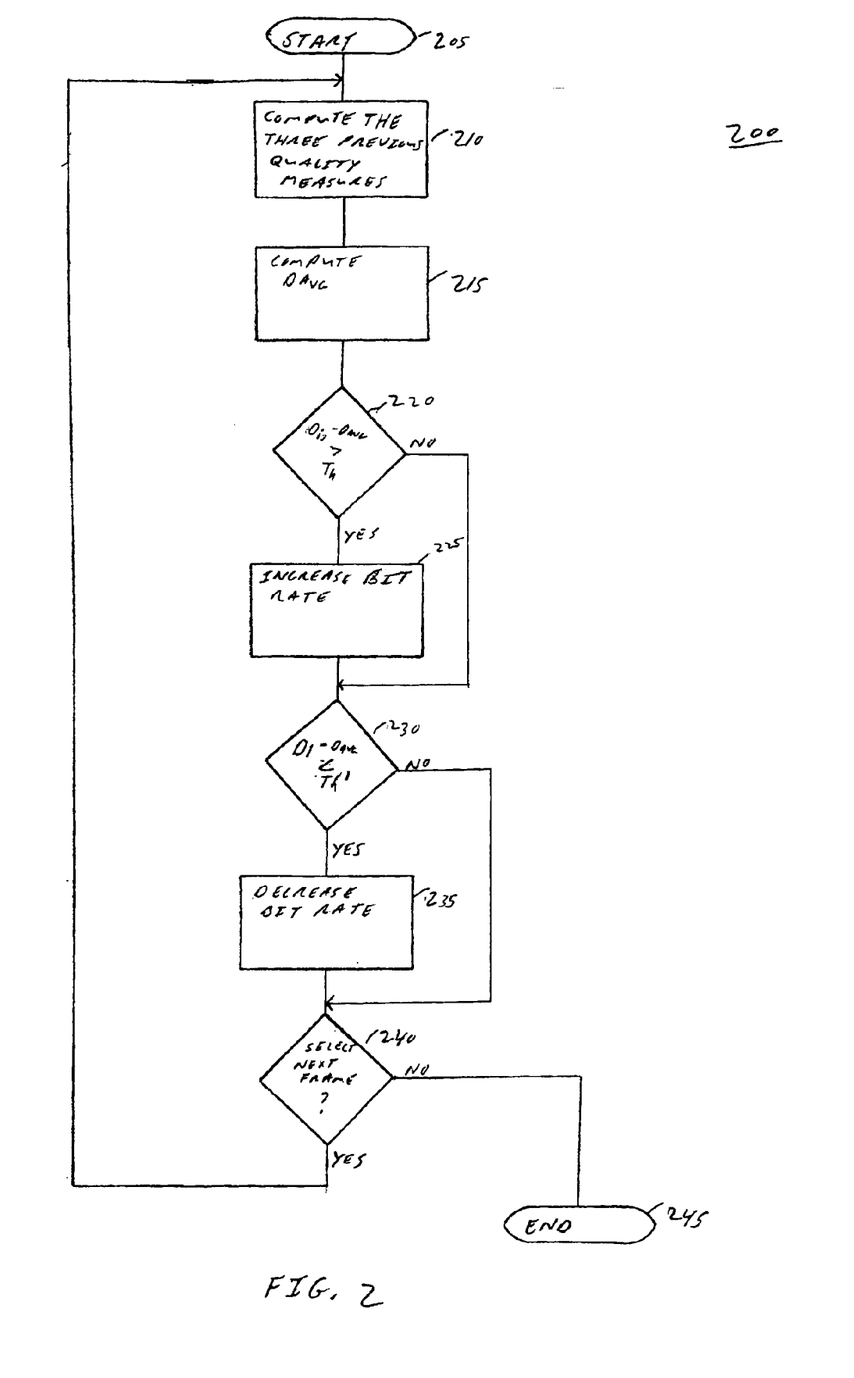
FIG. 2 illustrates a flowchart for a rate control method according to the invention.

FIG. 2 illustrates a flowchart for a rate control method 200 according to the invention. The method 200 begins at step 205 and proceeds to step 210 where the method computes or acquires quality measures for the three previous frames of the same type. Namely, three picture quality measures "$D_i$" where i=1, 2 and 3 are computed for previous I, P and B frames. For example, if a current frame is to be encoded as an I-frame, then the picture quality measures for the three immediate previous I-frames are used. Similarly, if a current frame is to be encoded as a P-frame, then the picture quality measures for the three immediate previous P-frames are used.

In one embodiment, as discussed below, the picture quality measure is a just noticeable difference (JND) measure. An example of a description of a just noticeable difference measure can be found in U.S. Pat. No. 5,694,491, issued Dec. 2, 1997, which is incorporated herein by reference. However, it will be appreciated by those skilled in the art that although the invention is discussed in the context of JND, other picture quality measures may be used i.e., peak signal-to-noise ratio (PSNR) and mean square error (MSE). It will also be appreciated that an average of three measures is only an example. The invention can be adapted to three or more average measures or two average measures.

The method 200 computes, at step 215 the average distortion or average picture quality as:

$$D_{AVG} = \frac{D_1 + D_2 + D_3}{3} \quad (1)$$

At step 220, the method queries whether $D_i - D_{AVG}$ is greater than a threshold value, "Th" where in a preferred embodiment Th is set to 0.5 JND and $D_i$ a quality measure is for a current frame. The difference between $D_i - D_{AVG}$ is a resultant value "R". If the query is positively answered e.g., if R>Th, then method 200 proceeds to step 225 where the bit budget for a current frame is increased. The bit rate is increased because the projected distortion under a current target bit rate for the current frame will be greater by at least the threshold value as compared to at least three immediate previous frames of the same type. Thus, to reduce such a "spike" in distortion for the current frame, the bit budget is increased for the current frame to allow the encoder sufficient resources to reduce the distortion, e.g., reduce the size of the quantizer scale. If the query is negatively answered, then method 200 proceeds to step 230.

It should be noted that an initial bit budget can be acquired using traditional methods, e.g., TM4 and TM5 of the MPEG standard. Namely, the present invention can be adapted into existing encoders as a refinement module to more accurately predict or allocate bits between frames.

At step 230, method 200 queries whether $D_i - D_{AVG}$ is less than the threshold value "Th'". If the query is positively answered, e.g., if R<Th' where Th'<0, then method 200 proceeds to step 235 where the bit budget for a current frame is decreased. Namely, the current bit budget for a current frame is reduced because the projected distortion under the current target bit rate for the frame will be less than by at least the threshold value as compared to at least three immediate previous frames of the same type. Thus, to reduce such a "valley" in distortion for the current frame, the bit budget is decreased for the current frame to limit the resources of the encoder i.e., to increase the distortion e.g., increase the size of the quantizer scale. If the query is negatively answered, then method 200 proceeds to step 240.

At step 240, method 200 queries whether a next frame is to be selected. If the query is positively answered, then method 200 proceeds to step 210 where the entire process starts again for the next frame. If the query is negatively answered, then method 200 proceeds to step 245 where the method ends.

It should be noted that it is possible that no adjustment is necessary. For example, the initial predicted bit budget may generate a picture quality measure that falls within "Th" and "Th'". This occurs where the query at step 220 is negatively answered, then method 200 proceeds to step 230. At step 230, the query is again negatively answered where no adjustment is made to the existing bit budget for the current frame.

Figure 3:
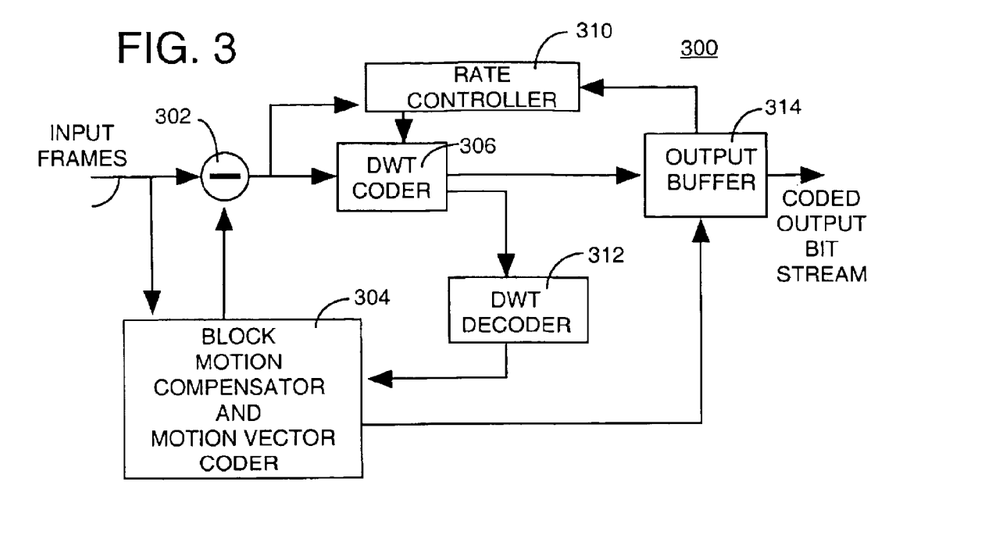
FIG. 3 depicts a block diagram of a wavelet-based encoder incorporating the present invention.

FIG. 3 depicts an encoder 300 that incorporates an alternate embodiment of the present invention. The encoder contains a block motion compensator (BMC) and motion vector coder 304, subtractor 302, discrete cosine transform (DWT) coder 306, bit rate controller 310, DWT decoder 312 and output buffer 314.

In general, the input signal is a video image (a two-dimensional array of pixels (pels) defining a frame in a video sequence). To accurately transmit the image through a low bit rate channel, the spatial and temporal redundancy in the video frame sequence must be substantially reduced. This is generally accomplished by coding and transmitting only the differences between successive frames. The encoder has three functions: first, it produces, using the BMC and its coder 304, a plurality of motion vectors that represent motion that occurs between frames; second, it predicts the present frame using a reconstructed version of the previous frame combined with the motion vectors; and third, the predicted frame is subtracted from the present frame to produce a frame of residuals that are coded and transmitted along with the motion vectors to a receiver. Within the receiver, a decoder reconstructs each video frame using the coded residuals and motion vectors. A wavelet-based video encoder having the general structure of that depicted in FIG. 3 is disclosed in U.S. Pat. No. 5,764,805, issued Jun. 9, 1998, which is incorporated herein by reference. This issued patent discusses the use of wavelet transforms to encode video signals.

Figure 4:
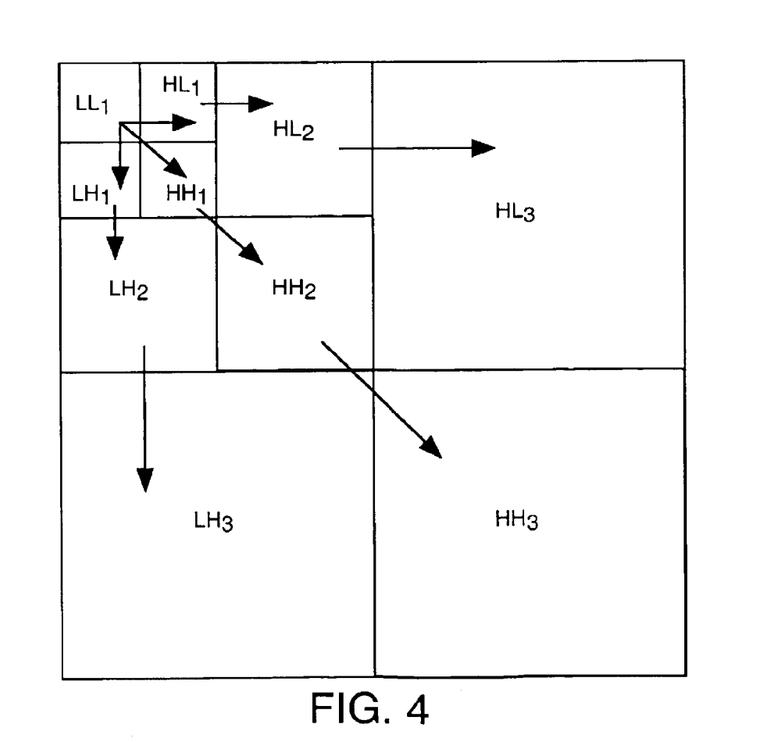
FIG. 4 is a graphical representation of a wavelet tree.

The discrete wavelet transform performs a wavelet hierarchical subband decomposition to produce a conventional wavelet tree representation of the input image. To accomplish such image decomposition, the image is decomposed using times two subsampling into high horizontal-high vertical (HH), high horizontal-low vertical (HL), low horizontal-high vertical (LH), and low horizontal-low vertical (LL), frequency subbands. The LL subband is then further subsampled times two to produce a set of HH, HL, LH and LL subbands. This subsampling is accomplished recursively to produce an array of subbands such as that illustrated in FIG. 4 where three subsamplings have been used. Preferably six subsamplings are used in practice. The parent-child dependencies between subbands are illustrated as arrows pointing from the subband of the parent nodes to the subbands of the child nodes. The lowest frequency subband is the top left $LL_1$, and the highest frequency subband is at the bottom right $HH_3$. In this example, all child nodes have one parent. A detailed discussion of subband decomposition is presented in J. M. Shapiro, "Embedded Image Coding Using Zerotrees of Wavelet Coefficients", IEEE Trans. on Signal Processing, Vol. 41, No. 12, pp. 3445–62, December 1993.

The DWT coder of FIG. 3 codes the coefficients of the wavelet tree in either a "breadth first" or "depth first" pattern. A breadth first pattern traverse the wavelet tree in a bit-plane by bit-plane pattern, i.e., quantize all parent nodes, then all children, then all grandchildren and so on. In contrast, a depth first pattern traverses each tree from the root in the low-low subband ($LL_1$) through the children (top down) or children through the low-low subband (bottom up).

This disclosure focuses on a technique for controlling the coding rate of an encoder, e.g., a wavelet encoder and a DCT encoder. Namely, the rate control method as discussed above can be implemented by the rate controller 310, of the wavelet encoder 300

Figure 5:
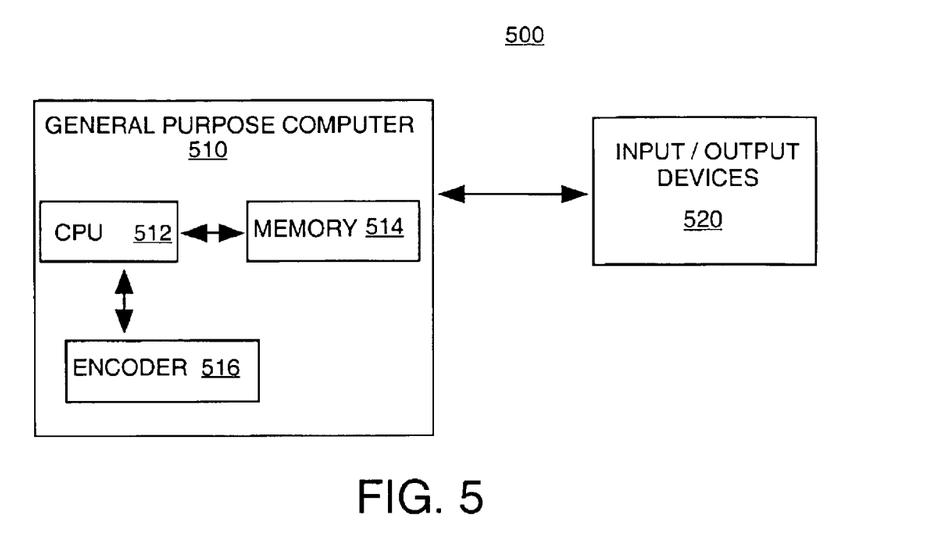
FIG. 5 illustrates an encoding system of the present invention.

FIG. 5 illustrates an encoding system 500 of the present invention. The encoding system comprises a general purpose computer 510 and various input/output devices 520. The general purpose computer comprises a central processing unit (CPU) 512, a memory 514 and an encoder 516 for receiving and encoding a sequence of images.

In the preferred embodiment, the encoder 516 is simply the encoder 100 and/or encoder 300 as discussed above. The encoder 516 can be a physical device which is coupled to the CPU 512 through a communication channel. Alternatively, the encoder 516 can be represented by a software application which is loaded from a storage device and resides in the memory 512 of the computer. As such, the encoder 100 and 300 of the present invention can be stored on a computer readable medium.

The computer 510 can be coupled to a plurality of input and output devices 520, such as a keyboard, a mouse, a camera, a camcorder, a video monitor, any number of imaging devices or storage devices, including but not limited to, a tape drive, a floppy drive, a hard disk drive or a compact disk drive. The input devices serve to provide inputs to the computer for producing the encoded video bit streams or to receive the sequence of video images from a storage device or an imaging device.

It should be noted that the present invention provides for two embodiments in the computation of the average quality measure $D_{AVG}$. In a first embodiment, the average quality measure may actually include the picture quality measure of the current frame, i.e., the quality measure of the current frame forms a part of the average measure. In a second embodiment, the average quality measure does not include the picture quality measure of the current frame, i.e., the quality measure of the current frame does not form a part of the average measure.

What is claimed is:

1. A method for adjusting a target bit rate for a frame, said method comprising the steps of:

(a) determining a picture quality measure of a current frame for a particular frame type;

(b) determining a picture quality measure for each of a plurality of immediately previous frames corresponding to said frame type of said current frame;

(c) computing an average picture quality measure from said picture quality measures of said plurality of immediately previous frames;

(d) computing a difference between the average picture quality measure and the picture quality measure of said current frame for producing a resultant value;

(e) comparing the resultant value to a threshold value for producing a comparing result; and (f) adjusting said target bit rate in response to said comparing result.

2. The method of claim 1, wherein said frame type is an intra-frame.

3. The method of claim 1, wherein said frame type is a predicted frame.

4. The method of claim 1, wherein said frame type is a bi-directional predicted frame.

5. The method of claim 1, where said adjusting step (f) comprises the step of:

reducing said target bit rate if said resultant value is less than said threshold value.

6. The method of claim 1, where said adjusting step (f) comprises the step of:

increasing said target bit rate if said resultant value is greater than said threshold value.

7. The method of claim 1, wherein said picture quality measure is a just noticeable difference (JND) measure.

8. The method of claim 1, wherein said picture quality measure is a peak signal to noise ratio (PSNR) measure.

9. The method of claim 1, wherein said picture quality measure is a mean square error (MSE) measure.

10. The method of claim 1, wherein said current frame is considered one of said plurality of immediately previous frames for computing said average picture quality measure.

11. A computer readable medium having stored thereon a plurality of instructions including instructions which, when executed by a processor, causes the processor to perform a method comprising the steps of:

(a) determining a picture quality measure of a current frame for a particular frame type;

(b) determining a picture quality measure for each of a plurality of immediately previous frames corresponding to said frame type of said current frame;

(c) computing an average picture quality measure from said picture quality measures of said plurality of immediately previous frames;

(d) computing a difference between the average picture quality measure and the picture quality measure of said current frame for producing a resultant value;

(e) comparing the resultant value to a threshold value for producing a comparing result; and (f) adjusting said target bit rate in response to said comparing result.

12. Apparatus for encoding an input image sequence having at least one input frame, where said frame is partitioned into at least one block, said apparatus comprising:

a block motion compensator for computing a motion vector for the block and for generating a predicted image using said motion vector;

a transform module for applying a transformation to a difference signal between the input frame and said predicted image, where said transformation produces a plurality of coefficients;

a quantizer for quantizing said plurality of coefficients with a quantizer scale;

a controller for adjusting a target bit rate for a current frame in response to comparing a difference of a picture quality measure of said current frame and an average picture quality measure of a plurality of immediately previous frames corresponding to a frame type of said current frame to a threshold value; and a coder for coding said plurality of quantized coefficients.

13. The apparatus of claim 12, wherein said frame type is an intra-frame.

14. The apparatus of claim 12, wherein said frame type is a predicted frame.

15. The apparatus of claim 12, wherein said frame type is a bi-directional predicted frame.

16. The apparatus of claim 12, wherein said controller reduces said target bit rate if said resultant value is less than said threshold value.

17. The apparatus of claim 12, wherein said controller increases said target bit rate if said resultant value is greater than said threshold value.

18. The apparatus of claim 12, wherein said picture quality measure is a just noticeable difference (JND) measure.

19. The apparatus of claim 12, wherein said picture quality measure is a peak signal to noise ratio (PSNR) measure.

20. The apparatus of claim 12, wherein said picture quality measure is a mean square error (MSE) measure.

21. The apparatus of claim 13, wherein said current frame is considered one of said plurality of immediately previous frames for computing said average picture quality measure.

* * * * *